United States Patent [19]

Shaff et al.

[11] Patent Number: 5,037,354
[45] Date of Patent: Aug. 6, 1991

[54] MECHANISM USEFUL AS A SLIP CLUTCH OR BRAKE

[76] Inventors: Gerald H. Shaff, 17 Whitling Farm Rd., Branford, Conn. 06405; Philip H. Carton-Bacon, 303 Summit St., New Haven, Conn. 06513

[21] Appl. No.: 377,610

[22] Filed: Jul. 10, 1989

[51] Int. Cl.⁵ .................. F16D 3/16; F16D 7/02
[52] U.S. Cl. ...................... 464/30; 464/106
[58] Field of Search ............ 403/132, 135, 138; 464/30, 36, 43, 44, 106

[56] References Cited

U.S. PATENT DOCUMENTS

| 101,940 | 4/1870 | Tatham | 464/44 |
|---|---|---|---|
| 514,384 | 2/1894 | Sellon | 464/44 X |
| 923,043 | 5/1909 | Gulick | 464/44 |
| 1,373,772 | 4/1921 | Sharples | 464/30 X |
| 2,244,143 | 3/1941 | Dowler | 464/43 X |
| 2,763,141 | 9/1956 | Dodge | 464/43 X |
| 2,861,462 | 11/1958 | Hussar | 464/44 X |
| 2,974,503 | 3/1961 | Newton | 464/44 |
| 3,071,899 | 1/1963 | Hicks et al. | 464/44 X |
| 3,388,607 | 6/1968 | Stober et al. | 464/44 X |
| 3,451,514 | 6/1969 | Ristow | 464/36 X |
| 3,481,160 | 12/1969 | Georgi | 464/30 |
| 3,854,557 | 12/1974 | Wilcox | 403/138 X |
| 4,375,194 | 3/1983 | Rohrbach | 464/43 X |
| 4,637,502 | 1/1987 | Mayr et al. | 464/36 X |
| 4,702,359 | 10/1987 | Menusco et al. | 192/56 R |

FOREIGN PATENT DOCUMENTS

| 845395 | 6/1970 | Canada | 464/106 |
|---|---|---|---|
| 458371 | 10/1913 | France | 464/44 |
| 52-24651 | 2/1977 | Japan | 464/36 |

Primary Examiner—Daniel P. Stodola
Attorney, Agent, or Firm—Robert H. Montgomery

[57] ABSTRACT

A mechanism useful as a slip clutch or brake which comprises a housing member having a shaft affixed thereto and extending from one end thereof and a ball at the other end thereof having a second shaft extending therefrom outwardly of the housing. The housing has a partial end wall with an opening therethrough for the second shaft and a friction material having a partially spherical surface in the housing and positioned against the partial end wall. The ball is seated against the partially spherical surface of the friction material and drives the housing therethrough, but will slip when a predetermined torque is exceeded. The ball is biased into engagement with the friction material whereby when one of the shafts is rotated, the other is driven through frictional engagement of the ball and the friction material. Where the mechanism is utilized as a brake, the shaft on the housing may be eliminated.

13 Claims, 2 Drawing Sheets

MECHANISM USEFUL AS A SLIP CLUTCH OR BRAKE

FIELD OF THE INVENTION

This invention relates to small clutches or brakes and more particularly relates to such devices of simplified construction which permit misalignment of the drive and driven shafts.

BACKGROUND OF THE INVENTION

The prior art discloses clutches or drives in which a drive and driven shaft may be misaligned as exemplified in U.S. Pat. No. 3,388,607. Moreover, the prior art also shows ball drives in a slip mechanism as exemplified in U.S. Pat. No. 4,637,502. There is a need for small clutches, brakes, and rotary holding devices in many applications such as tension control for material being wound or unwound, hinges and various other applications.

The present invention provides a new and improved slip clutch in which the two shafts may be mis-aligned and still one may drive the other and further provides a simplified and low cost clutch or brake mechanism.

SUMMARY OF THE INVENTION

Briefly stated the invention in one form thereof comprises a housing member having a shaft extending from one end thereof and a ball at the other end thereof having a second shaft extending therefrom outwardly of the housing. The housing has a partial end wall with an opening therethrough for the second shaft and a friction material having a partially spherical surface in the housing and positioned against the partial end wall. The ball is seated against the partially spherical surface of the friction material and drives the housing therethrough, but will slip when a predetermined torque is exceeded. Means are provided in the housing for biasing the ball into engagement with the friction material whereby when one of the shafts is rotated, the other is driven through frictional engagement of the ball and the frictional material. The structure may also be used as a brake or restraining device.

An object of this invention is to provide a new and improved slip clutch or brake.

Another object of this invention is to provide a new and improved slip clutch or brake where the one shaft may be angularly misaligned with the other.

A further object of this invention is to provide a miniature clutch which is of simplified construction and reduced cost in which the drive and driven shafts may be angularly misaligned.

A still further object of this invention is to provide a clutch construction which permits a drive arrangement between two shafts which are both angularly and/or axially misaligned.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

BRIEF DESCRIPTION OF THE DRAWINGS

FIG. 5a is a side elevation of a mechanisms embodying the invention useful as a brake or holding device.

FIG. 5b is an end view of the mechanism of FIG. 5a.

FIG. 6a is a side elevation of another mechanism embodying the invention useful as a brake or holding device.

FIG. 6b is an end elevation of the mechanism of FIG. 6a.

DETAILED DESCRIPTION OF PREFERRED EMBODIMENTS OF THE INVENTION

Figure 1:
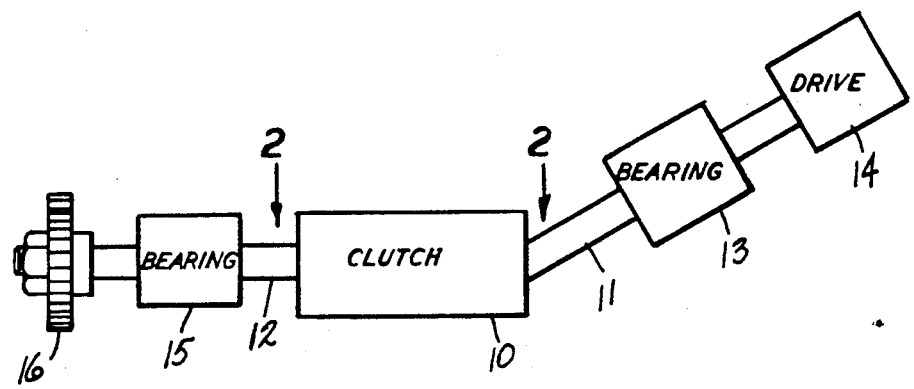
FIG. 1 is a drawing in block form indicating an application of the invention.

FIG. 1 exemplifies a clutch 10 having a shaft 11 which will be referred to as a drive shaft and a shaft 12 which will be referred to as a driven shaft. It is to be understood, however, that in actual practice either shaft may be the drive shaft. Shaft 11 is journaled in a bearing 13 and connected to a drive means 14 such as a sprocket, a gear, a pulley or other drive coupling. Shaft 12 is journaled in a bearing 15 and carries on the end thereof a drive mechanism such as a gear 16.

Figure 2:
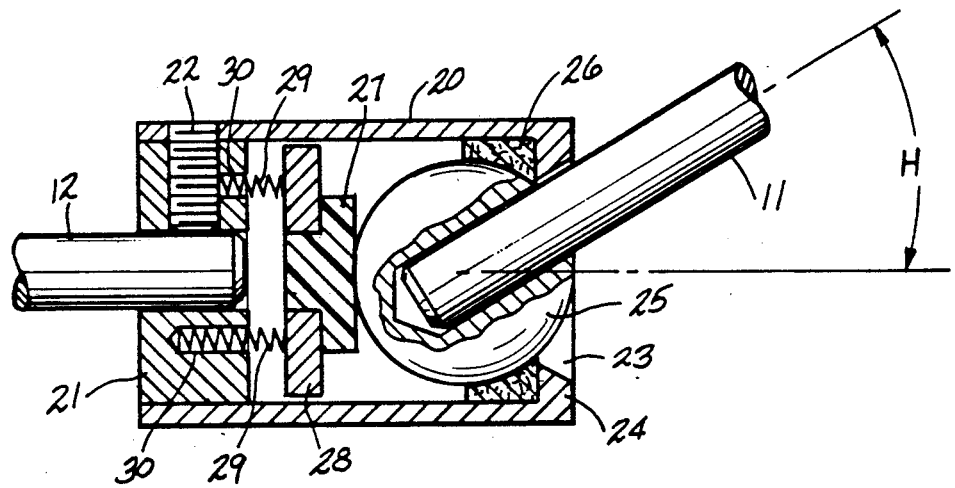
FIG. 2 is a sectional view seen in the plane of lines 22 of FIG. 1.

Reference is now made to FIG. 2 which exemplifies the clutch 10 in longitudinal cross section. Clutch 10 comprises a housing member 20 which is closed at one end thereof by an end piece 21 which receives shaft 12 therein are shaft 12 is secured thereto as by means of a set screw 22 as shown, or a spline or other type coupling which renders shaft non-rotatable with respect to housing member 20. The housing has an opening 23 at the other end thereof through a partial end wall 24 through which shaft 11 extends. Shaft 11 has affixed thereto a drive ball 25 which is metallic and is preferably brass or bronze. Disposed within housing 20 and against end wall 24 within the internal periphery of housing 20 is a friction material which has a partially spherical surface upon which ball 25 seats. The friction material is preferably a plastic base fibrous material. It may be press fitted into housing 20, adhered therein or keyed therein. Ball 25 is biased into engagement with material 26 by a pressure pad 27 of very low friction material such as nylon or teflon. Pad 27 is carried by a washer-like member 28 which is biased toward ball 25 by a spring or a plurality of springs 29 received in spring sockets 30 in closure member 21. It will be noted that the pad 27 contacts ball 25 at a point which is on or near the axis of shaft 12. This minimizes any torque on pad 27. Ball 25 has large surface area contact with the friction material 26 and the friction material will conform to the contacting surface of the ball. The opening 23 is larger than the diameter of shaft 11 to permit rotation or angular movement of shaft 11 on friction material 26 as exemplified by the angle H in FIG. 2.

In operation, when shaft 11 is driven, it frictionally engages material 26 and will turn housing 20 and hence driven shaft 12. The device of FIG. 2 is set for a predetermined torque at which it will slip determined by the bias exerted thereon by pad 27. When the predetermined torque is exceeded ball 25 will slip on the mating surface of friction material 26. Then housing 20 and consequently shaft 12 will not turn. The housing 20 may be fixed in which case there is no need for the driven shaft 12. In this situation, the friction material 26 bearing on ball 25 will act as a brake or a holding device such as may be required on a hinge.

Figure 3:
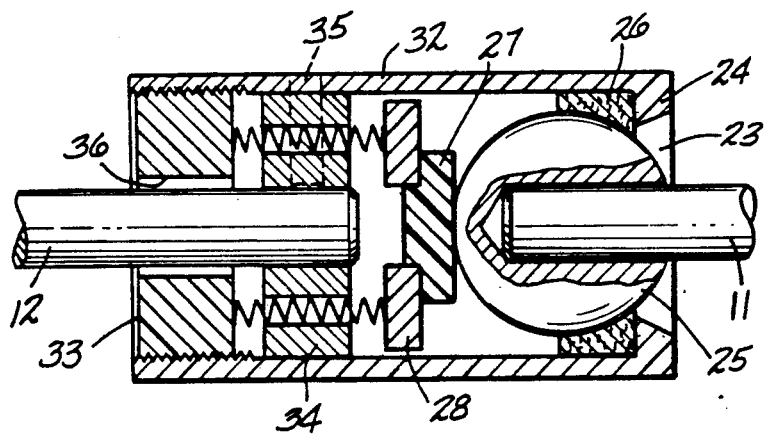
FIG. 3 is a longitudinal sectional view similar to FIG. 2 of a second embodiment of the invention.

Reference is now made to FIG. 3 which exemplifies another embodiment of the invention, where the slip torque is adjustable. In FIG. 3 the same reference numerals as used in FIG. 2 are utilized to identify common elements. In FIG. 3 there is a housing 32 which threadably receives a closure member 33 at one end thereof. A member 34 is press fitted within housing 32 and secured thereto is shaft 12 by a set screw 35. Closure member 33 has a passage 36 therethrough to permit exit of shaft 12 from housing 32. The operation of the embodiment of FIG. 3 is the same as the operation of that of FIG. 2. Either shaft may be the drive shaft. However, in the embodiment of FIG. 3, the slip torque is adjustable dependent on the position of closure member 33 along the longitudinal axis of housing 32.

Figure 4:
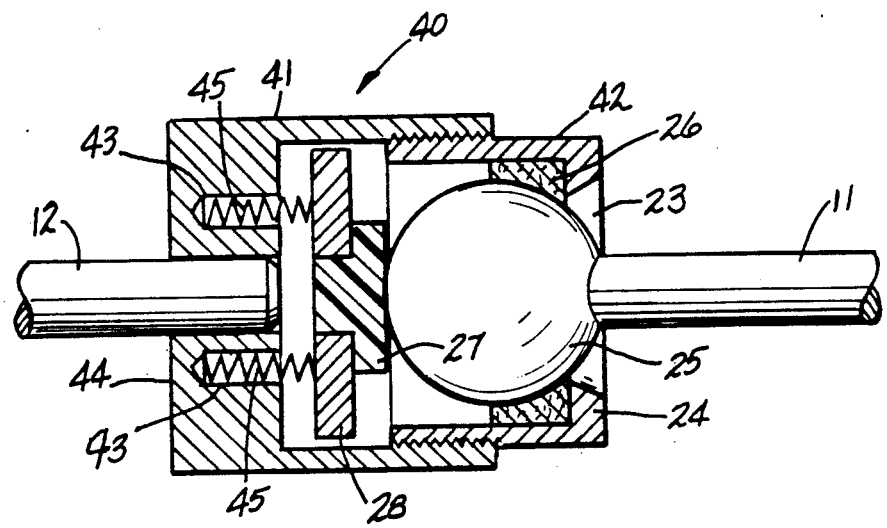
FIG. 4 is also a longitudinal sectional view similar to FIG. 2 showing another embodiment of the invention.

FIG. 4 exemplifies another embodiment of the invention in which the torque is adjustable. A housing 40 comprising members 41 and 42 are threadably connected for relative longitudinal adjustment. Member 42 carries friction material 26 and ball 25 thereon. A plurality of spring pockets 43 are defined in the back wall 44 of housing member 41 and receive springs 45 therein which bear on member 28. As before, pad 27 bears on ball 25 and urges it into engagement with friction material 26.

Housing member 42 may be threadably adjusted within housing member 41 to predetermine the torque at which ball 25 will slip on friction material 26.

Figures 5A, 5B:
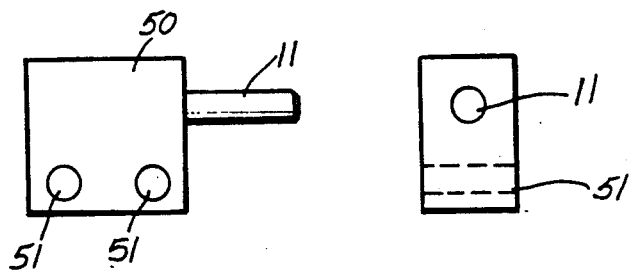

The examples set forth above show the invention embodied in slip clutch mechanisms. The invention may be also embodied in a brake as shown in FIG. 5a and 5b in which a housing member 50 has mounting holes 51 therethrough adapted to be fixedly mounted. In this case, the device is utilized as a brake or a holding device. In such applications, the housing may take various outside geometrical configurations, e.g. square or hexagonal to be received in a holding device.

Figures 6A, 6B:
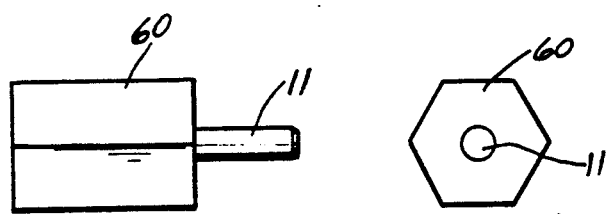

FIG. 6a and 6b exemplifies another arrangement which may be utilized as a brake or holding device. A hexagonal housing member 60 may be received in a socket and rendered stationary in which case only shaft 11 is rotated and the ball 25 thereon in engagement with the friction material 26 will act as a brake or retarding or holding means. The internal structure of the brakes of FIG. 5a and 5b, and 6a and 6b may take the form shown in any of FIGS. 2, 3, or 4, the only difference being that a shaft 12 is not present, and the housing does not rotate.

The pad 27 produces little resistance to ball 25 turning thereon and acts to predetermine the frictional contact of the ball 25 and material 26.

Clutches or brakes embodying the invention may have an angle of misalignment H as exemplified in FIG. 2 dependent upon the diameter of the housing 20, the size of opening 23, and the diameter of shaft 11.

A further advantage of devices embodying the invention is that they do not require close tolerances except on the ball 25. The ball 25 will seat itself into the friction material and it is not difficult to obtain a good sphere on the ball.

As previously pointed out, either of shafts 11 or 12 may be the drive or driven shafts. The driving torque occurs between the friction material 26 and what may be termed the rear hemisphere of the ball, although what is termed the rear hemisphere of ball 25 will vary dependent on the angle H exemplified in FIG. 2.

Figure 7:
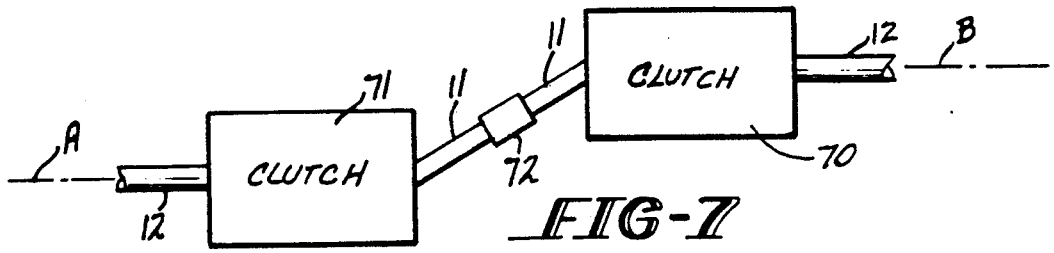
FIG. 7 is a view of an embodiment of the invention where two clutches embodying the invention are connected to provide for both axial and angular misalignment.

FIG. 7 exemplifies an arrangement where two clutches 70 and 71 embodying the invention as disclosed in FIGS. 2, 3, or 4 have their shafts 11 joined by a coupling 72. In this case one of shafts 12 is a drive shaft and the other is a driven shaft where the drive and driven shafts are axially misaligned, on axis A and B and the angular misalignment of shafts 11 compensate for the axial misalignment of the shafts 12. It will be understood, that the shafts 12 could also be angularly misaligned as well as the axes of shafts 11, and more than two of the devices utilized.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments of the invention which do not depart from the spirit and scope of the invention.

What is claimed is:

1. A clutch comprising a housing member having a first shaft affixed thereto and extending from one end thereof, a ball at the other end thereof having a second shaft extending therefrom outwardly of said housing member at the end opposite said first shaft, said housing member having an end wall with an opening therethrough for said second shaft, a member of friction material having a partially spherical surface in said housing member and seating against said end wall, said ball being seated against said partially spherical surface and angularly rotatable thereon to vary the angle between said first and second shafts, and biasing means in said housing member biasing said ball into engagement with said partially spherical surface of said friction material whereby when one of said shafts is rotated the other is driven through the frictional engagement of said ball and said friction material said ball being slippable on said friction material when a predetermined torque therebetween is exceeded, said biasing means having point contact with said ball substantially on the axis of said first shaft.

2. The clutch of claim 1 wherein said biasing means includes a pad of low friction material urged into engagement with said ball and contacting said ball at a point on the axis of said first shaft.

3. The clutch of claim 1 further including means for adjusting said biasing means into frictional engagement between said ball and said friction material.

4. The clutch of claim 1 wherein said housing has a second end wall and said first shaft is affixed thereto, said biasing means comprising a washer-like member carrying a pad of low friction material which engages said ball, and springs extending between said second end wall and said washer like member.

5. The clutch of claim 1 further comprising a member secured to said housing and having said first shaft affixed thereto, a second end wall threadably received in said housing said first shaft extending through an opening in said second end wall, a biasing member of low friction material contacting said ball, and a plurality of springs seated on said second end wall, extending through said member secured and acting on said biasing member.

6. The clutch of claim 1 wherein said housing member is formed in threadably connected parts and said members may be longitudinally adjusted to vary the bias on said ball.

7. The clutch of claim 1 wherein said housing member has a second end wall and said first shaft is secured to said second end wall.

8. First and second clutch devices having first and second housing members, each of said housing members having first shafts affixed thereto and extending from one end thereof, each of said devices having a ball at the other end thereof with a second shaft extending therefrom outwardly of said housing members at the ends opposite said first shafts, each of said housing members having an end wall with an opening extending therethrough for said second shafts, a member of friction material having a partially spherical surface in each of said housings seated against said end walls, said balls being seated against said partially spherical surfaces, said balls being angularly rotatable on said respective friction materials to vary the angle of said second shafts with respect to the axes of said first shafts, biasing means in each of said housings biasing said balls against said partially spherical surfaces of said respective friction materials, and means coupling said second shafts, whereby said first shifts may be axially misaligned and a driving force transmitted through said second shafts from one of said first shafts to the other, said balls being slippable on said friction materials when a predetermined torque therebetween is exceeded, said biasing means having point contact with said balls substantially on the axes of said first shafts.

9. The arrangement of claim 8 where said first shafts are axially offset.

10. The arrangement of claim 8 where either of said first shafts may be a drive shaft and the other is a driven shaft.

11. A mechanism comprising a housing member having a longitudinal axis, a ball in said housing member having a shaft extending therefrom outwardly of said housing, said housing having an end wall with an opening therethrough for said shaft, a member of friction material having a partially spherical surface in said housing member and seated against said end wall, said ball being seated against said partially spherical surface and being angularly rotatable thereon to vary the angle of said shaft with respect to said longitudinal axis, said opening in said end wall being of greater dimension than the diameter of said shaft to permit angular movement of said ball on said friction material and biasing means in said housing biasing said ball into engagement with said friction material, said shaft adapted to be subjected to a rotation, said ball being slippable on said friction material when a predetermined torque therebetween is exceeded, said biasing means having point contact with said ball.

12. The mechanism of claim 11 including a further shaft connected on said housing along the longitudinal axis thereof whereby one of said shafts may drive the other of said shafts through said housing.

13. The mechanism of claim 11 where said biasing means includes a pad of low friction material urged into engagement with said ball and contacting said ball at a point essentially on the axis of said housing.

* * * * *